United States Patent [19]

Pearce et al.

[11] Patent Number: 5,348,985
[45] Date of Patent: Sep. 20, 1994

[54] PROCESS FOR MAKING THERMOPLASTIC POLYESTER FOAMS

[75] Inventors: Eric J. Pearce, Ballston Lake; John W. Carbone, Schenectady, both of N.Y.

[73] Assignee: General Electric Company, Schenectady, N.Y.

[21] Appl. No.: 181,944

[22] Filed: Jan. 18, 1994

[51] Int. Cl.$^5$ .................. C08G 63/00; C08G 63/78; C08J 9/06; C08J 9/12
[52] U.S. Cl. .................. 521/124; 521/126; 521/182; 528/272; 528/274; 528/277; 528/279; 528/283
[58] Field of Search .............. 521/182, 126, 124; 528/272, 274, 277, 279, 283

[56] References Cited

U.S. PATENT DOCUMENTS

| | | | |
|---|---|---|---|
| Re. 34,431 | 11/1993 | Brunelle et al. | 528/195 |
| 4,132,707 | 1/1979 | Borman | 528/273 |
| 4,980,453 | 12/1990 | Brunelle et al. | 528/195 |
| 5,039,783 | 8/1991 | Brunelle et al. | 528/272 |
| 5,136,018 | 8/1992 | Boden et al. | 528/271 |
| 5,191,013 | 3/1993 | Cook et al. | 524/601 |
| 5,214,158 | 5/1993 | Brunelle et al. | 528/274 |
| 5,231,161 | 7/1993 | Brunelle et al. | 528/397 |

*Primary Examiner*—Morton Foelak
*Attorney, Agent, or Firm*—William H. Pittman

[57] ABSTRACT

A process for making thermoplastic polyester foams comprises the steps of subjecting macrocyclic polyester oligomer precursors to initiators and blowing agents at a constant operating temperature in order to produce foams which unexpectedly display low foam densities.

14 Claims, No Drawings

PROCESS FOR MAKING THERMOPLASTIC POLYESTER FOAMS

FIELD OF THE INVENTION

This invention relates to a novel process for making thermoplastic polyester foams. More particularly, the invention is directed to a process for making said thermoplastic polyester foams by subjecting macrocyclic polyester oligomer precursors to initiators and blowing agents while preferably maintaining a constant operating temperature.

1. Background of the Invention

It is well known that solids can be made into three dimensional cellular materials (foams). Techniques exist for making foams out of a sundry of solids which include polymers, metals and ceramics. Such foams may be employed, for instance, in packaging materials and crash protection equipment, wherein they absorb energies originating from impacts. Moreover, the foams may be used in nonmechanical applications such as thermal insulators, flotation devices and filters.

Conventional processes for producing foams often require the subjection of solids to decomposable blowing agents while varying temperatures. Additional processes include gas dissolution in heated solids which are under high pressure and soluble solid incorporation into solids followed by molding and leaching with solvents.

The instant invention, therefore, is directed to a novel process for making thermoplastic polyester foams. The thermoplastic polyester foams are prepared by subjecting low viscosity macrocyclic polyester oligomer precursors to initiators and blowing agents while preferably maintaining a constant operating temperature, Moreover, said thermoplastic polyester foams unexpectedly display low foam densities.

2. Description of the Prior Art

Processes for preparing polyesters have been disclosed in the art. In commonly assigned U.S. Pat. No. 5,039,783, macrocyclic polyester oligomers are prepared via the condensation of diols with diacid chlorides in the presence of non-sterically hindered amine catalysts.

Additionally, in commonly assigned U.S. Pat. No. 4,132,707, a method for converting linear polyesters to branched copolyesters is described. In said method, poly(alkylene terephthalate) is combined with a mixture of phenol and tetrachloroethane and a branching component in order to produce a solid particulate blend. The solid particulate blend is subsequently heated in the presence of an inert gas in order to produce the desired branched copolyester.

Still other investigators have focused on the production of porous resins. Engel et al., *Structural Plastics*, page 150 (1950), discloses that plastics may be expanded when combined with actions of a decomposing blowing agent such as sodium bicarbonate, ammonium carbonate or diazoaminobenzene.

The instantly claimed invention is patentably distinguishable from the above-described since, among other reasons, it is directed to a novel process for making thermoplastic polyester foams by subjecting low viscosity macrocyclic polyester oligomer precursors to initiators and blowing agents while preferably maintaining a constant operating temperature. Moreover, a second embodiment of the instant invention pertains to thermoplastic polyester foams which unexpectedly display low foam densities.

SUMMARY OF THE INVENTION

In a first aspect, the instant invention is directed to a novel process for producing thermoplastic polyester foams. Said novel process comprises the steps of subjecting low viscosity macrocyclic polyester oligomer precursors to initiators and blowing agents while preferably maintaining a constant operating temperature. In the instant invention, low viscosity is defined as less than about 1,000 centipoise, preferably less than about 100 centipoise and most preferably less than about 40 centipoise at operating temperatures. Moreover, since the macrocyclic polyester oligomer precursors possess low viscosities, as defined above, they are defined as being free flowing at the operating temperatures.

There are no limitations with respect to the blowing agents employed in the instant invention other than that they possess a boiling point below operating temperatures and often less than about 205° C. and preferably less than about 175° C. and most preferably less than about 50° C. or that they decompose at operating temperatures. Additionally, in the instant invention, thermoplastic polyester foams can unexpectedly be produced by boiling the blowing agents in contact with the precursors. Although blowing agents that decompose may be employed, the decomposition of blowing agents as often required in conventional processes is not a requirement in the instant invention.

In the instant invention, the operating temperature is any temperature which renders the macrocyclic polyester oligomer precursors free flowing liquids (often referred to as a melt) at the above-mentioned viscosities. However, as discussed in detail hereinafter, the operating temperature is low enough so that after the macrocyclic polyester oligomer precursor is subjected to the blowing agent and initiator, a solid thermoplastic polyester foam unexpectedly displaying low foam density is recovered. The operating temperature is typically greater than about 165° C. but less than about 220° C. An operating temperature of about 175° C. to about 205° C. is often preferred.

It is therefore evident that in the instant novel process a free flowing precursor is transformed into a solid foam without the need of a cooling step, and hence, at one operating temperature. However, higher temperatures and a cooling step may be employed if desired.

In a second aspect of the instant invention, thermoplastic polyester foams which unexpectedly display, low densities are produced and low density as used throughout is defined as less than about 0.9 g/cm³ and preferably less than about 0.6 g/cm³.

DETAILED DESCRIPTION OF THE PREFERRED EMBODIMENTS

The macrocyclic polyester oligomer precursors employed in the instant invention are preferably macrocyclic poly(alkylene dicarboxylate) oligomers comprising structural units of the formula

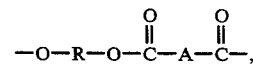

wherein R is an alkylene or mono- or polyoxyalkylene radical containing a straight chain of about 2–8 atoms and A is a m- or p-linked monocyclic aromatic or alicyclic radical. Hence, it is preferred that the macrocyclic polyester oligomer precursors are of the family consisting of polymeric glycol terephthalates or isophthalates and mixtures thereof including copolyesters of terephthalic and isophthalic acids. They are typically characterized by an Mn value of less than about 1500 but preferably about 300 to about 800. Especially preferred precursors employed in the instant invention are macrocyclic poly(ethylene terephthalate) (PET) and poly (1,4-butylene terephthalate) (PBT) oligomers and copolyesters comprising the same. Said copolyesters typically comprise less than about 25% by weight PET but preferably less than about 15% by weight PET.

The precursors may be prepared by a method which comprises contacting at least one diol of the formula HO—R—OH and at least one diacid chloride of the formula

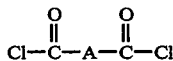

under substantially anhydrous conditions and in the presence of a substantially water immiscible organic solvent, with at least one unhindered tertiary amine; said contact being conducted at a temperature from about −25° to about +25° C.

Other reagents used to synthesize the macrocyclic poly(alkylene dicarboxylate) oligomers employed in the instant invention include unhindered tertiary amines and substantially water-immiscible organic solvents. A detailed description for the preparation of the above-mentioned macrocyclic polyester oligomer precursors employed in this invention may be found in commonly assigned U.S. Pat. No. 5,039,783, the disclosure of which is incorporated herein by reference.

The blowing agents employed in the instant invention are any of those which: (1) are compatible with the oligomer precursors; (2) ensure uniform transition to the foam; and (3) give high blowing efficiency for the minimum concentration and price.

Both physical blowing agents (PBA) and chemical blowing agents (CBA), as well as mixtures thereof may be employed to produce the low density thermoplastic polyester foams of the instant invention.

Illustrative examples of PBAs that may be employed include hydrogen, hydrocarbons, inert gases such as nitrogen and carbon dioxide and halocarbons such as dichloromethane. The PBAs can be introduced into the foaming system either as a volatile fluid or as a compressed gas and they may be introduced directly into the precursor when it is in the form of a melt or beforehand. When gases are employed as PBAs, they are forced into the melt at high pressure and they are expanded into bubbles to cause foaming by reducing the pressure. Alternatively, when the PBAs are liquids, they are mixed in the melt and volatize upon heating to form vapor bubbles which results in foaming.

Illustrative examples of CBAs that may be employed in the instant invention include azodicarbonamide, ammonium carbonate, diazoaminobenzene, bicarbonates of the alkali metals and p,p′-oxy-bis(benzene sulfonyl hydrazide). The CBAs are typically introduced into the melt and they may be, for example, in the form of powders, pellets, concentrates or dispersions. It is also within the scope of the invention to include special additives called activators or "kickers" such as zinc stearate which lower the decomposition temperatures of many CBAs. The CBAs work by decomposing upon heating in the melt or by causing gases to be released when mixed in the melt.

Each process can produce open or closed-cell foams. The final structure of the foam depends on the rheology and surface tension of the melt. Further, the foams of the instant invention are not limited to any particular cell size.

It is also within the scope of the instant invention to use supercritical liquids (either alone or with mixtures of PBAs and CBAs) such as liquid carbon dioxide as the blowing agent in the instant invention.

Initiators (often called polymerization catalysts) are employed in the instant invention in order to convert the cyclic macrocyclic polyester oligomer precursors to linear polymers. Such initiators are typically added in the amount of about 0.01 to about 1.5 but preferably about 0.05 to about 0.5 mole percent. They may be added within a large temperature range, for instance, 150°–350° C. However, it is preferred that they are added at operating temperatures. The linear polymers generally have Mn values of about 5,000 to about 250,000 but they preferably have Mn values of about 10,000 to 80,000.

The initiators employed in the instant invention include alkali metal salicylates, stannous alkoxides, organotin compounds and organotitanates. Illustrative salicylates are lithium salicylate, sodium salicylate and potassium salicylate, with lithium salicylate generally being preferred. Illustrative stannous alkoxides are the methoxide, ethoxide and propoxides. Illustrative organotin compounds are dialkyltin(IV) oxides such as di-n-butyltin(IV) oxide and di-n-octyltin oxide and acyclic and cyclic dialkyltin(IV) dialkoxides such as di-n-butyltin-(IV) di-n-butoxide, 2,2-di-n-butyl-2-stanna-1,3-dioxacycloheptane, 1,1,6,6,-tetra-n-butyl-1,6-distanna-2,5,7,10-tetraoxacyclodecane and any compound that may be classified as a stannoxane type initiator. An illustrative organotitanate is titanium(IV) 2-ethylhexoxide.

The process for making the thermoplastic polyester foams of the instant invention comprises the steps of:

(a) heating to an operating temperature a macrocyclic polyester oligomer precursor to produce a free flowing precursor;

(b) subjecting said free flowing precursor to a blowing agent and an initiator; and (c) recovering said thermoplastic polyester foams.

In the instant invention, the blowing agent may be added before or after the initiator. However, if the initiator is added first, the blowing agent should be added when less than about 75% but preferably less than about 50% of the macrocyclic polyester oligomer is converted to linear polymer. Moreover, it is also within the scope of the instant invention to add the blowing agent and initiator contemporaneously.

As previously stated, the macrocyclic polyester oligomer precursors become free flowing liquids (melts) after being heated to the operating temperature. Once the melt is subjected to initiator, a high molecular weight linear polymer is produced which typically melts at a temperature higher than the temperature (operating temperature) required to convert the precursors to a melt. Since the operating temperature is below the temperature required to melt the linear polymer, the linear polymer crystallizes at the operating temperature forming a solid. Thus, the precursor to melt to solid transformation is isothermal and the product is a foam as a result of the action of the blowing agent prior to solid formation. Furthermore, it is noted that the initiators often become end termination groups of the linear polymer as well as compounds incorporated into the linear polymer backbone.

The following example is to further illustrate and facilitate the understanding of the invention. The product obtained may be confirmed by conventional techniques such as proton and carbon 13 nuclear magnetic resonance spectroscopy, infrared spectroscopy and GPC analysis.

EXAMPLE

A 150 ml beaker was charged with 100 g of a PET/PBT copolyester macrocyclic oligomer precursor (10% by weight PET) and heated in an oil bath until a melt was formed. The melt was stirred with a mechanical stirrer and 10 ml of a 15% w/v solution of stannoxane initiator (1,1,6,6-tetra-n-butyl- 1,6-distanna-2,5,7,10-tetraoxacyclodecane) in dichloromethane was injected into the stirring melt. The resulting initiator concentration was 0.5 mole % relative to PBT repeat units. Foaming was observed immediately upon injection of the initiator solution. A linear PET/PBT thermoplastic polyester foam began to form and samples of the material were taken for GPC analysis at 30 seconds and 60 seconds. The analysis indicated, respectively, 5% and 34% conversion to polymer foam. The polyester foam began to solidify due to crystallization after about 60 seconds. The polyester foam was removed from the oil bath 120 seconds after injection of the initiator. GPC analysis indicated that 58% of the macrocyclic copolyester oligomer precursor was converted to linear PET/PBT polyester foam having an Mw relative to polystyrene of 56,000. The density of the foam was unexpectedly 0.57 g/cm$^3$.

What is claimed is:

1. A process for making thermoplastic polyester foam comprising the steps of:
   (a) heating to an operating temperature macrocyclic polyester oligomer precursors to produce free flowing precursors;
   (b) subjecting said free flowing precursors to a blowing agent and an initiator; and
   (c) recovering said thermoplastic polyester foam.

2. A process for making a thermoplastic polyester foam in accordance with claim 1 wherein said operating temperature is from about 165° C. to about 220° C.

3. A process for making a thermoplastic polyester foam in accordance with claim 2 wherein said operating temperature is from about 175° C. to about 205° C.

4. A process for making a thermoplastic polyester foam in accordance with claim 1 wherein said macrocyclic polyester oligomer precursors have structural units of the formula

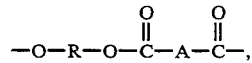

wherein R is an alkylene or mono- or polyoxyalkylene radical containing a straight chain of about 2–8 atoms and A is a m- or p-linked monocyclic aromatic or alicyclic radical.

5. A process for making a thermoplastic polyester foam in accordance with claim 4 wherein said macrocyclic polyester oligomer precursors are macrocyclic poly(ethylene terephthalate), poly(1,4-butylene terephthalate) or copolyesters comprising the same.

6. A process for making a thermoplastic polyester foam in accordance with claim 5 wherein said copolyesters comprise less than about 25% by weight poly(ethylene terephthalate).

7. A process for making a thermoplastic polyester foam in accordance with claim 6 wherein said copolyesters comprise less than about 15% by weight poly(ethylene terephthalate).

8. A process for making a thermoplastic polyester foam in accordance with claim 1 wherein said free flowing precursors have a viscosity of less than about 1,000 centipoise.

9. A process for making a thermoplastic polyester foam in accordance with claim 1 wherein said free flowing precursors have a viscosity of about 100 centipoise.

10. A process for making a thermoplastic polyester foam in accordance with claim 9 wherein said free flowing precursors have a viscosity of about 40 centipoise.

11. A process for making a thermoplastic polyester foam in accordance with claim 1 wherein said blowing agent is a physical blowing agent, chemical blowing agent, supercritical liquid or mixture thereof.

12. A process for making a thermoplastic polyester foam in accordance with claim 11 wherein said blowing agent is a physical blowing agent.

13. A process for making a thermoplastic polyester foam in accordance with claim 11 wherein said blowing agent is a chemical blowing agent.

14. A process for making a thermoplastic polyester foam in accordance with claim 1 wherein said initiator is an organotitanate, alkali metal salicylate, stannous alkoxide or organotin compound.

* * * * *